United States Patent Office 3,422,095
Patented Jan. 14, 1969

3,422,095
$N^1$- AND/OR $N^4$-(LOWER ALKOXYACETYL) SULFANILAMIDES
Harry Allen Albrecht, Nutley, and John Thomas Plati, Rutherford, N.J., assignors to Hoffmann-La Roche Inc., Nutley, N.J., a corporation of New Jersey
No Drawing. Continuation-in-part of application Ser. No. 591,979, Nov. 4, 1966. This application Dec. 20, 1966, Ser. No. 603,119
U.S. Cl. 260—239.9         26 Claims
Int. Cl. C07d 85/46; A61k 27/00

ABSTRACT OF THE DISCLOSURE

Anti-bacterial $N^1$- and/or $N^4$-(lower alkoxyacetyl)-$N^1$-(substituted isoxazolyl)sulfanilamides, prepared by reacting the corresponding unacylated $N^1$-substituted isoxazolyl sulfanilamides with a lower alkoxyacetic acid, are described.

---

This invention is concerned with novel sulfanilamides. More particularly, this invention is concerned with antibacterial $N^1$- and/or $N^4$-(alkoxyacetyl)sulfanilamides characterized by low toxicity.

This application is a continuation-in-part of copending application Ser. No. 591,979, filed Nov. 4, 1966, now abandoned.

It is well known that sulfanilamides, particularly those which are substituted on the $N^1$-atom with an aromatic heterocyclic radical, possess valuable antibacterial activities. In many instances, however, these sulfanilamides are too toxic to be of substantial use in many applications. Furthermore, it is known that the toxic effects of many sulfanilamides are cumulative, thus requiring low dosages if sulfanilamide treatment is to be conducted over a long period of time. Many variations of sulfanilamides, such as the addition of an alkanoyl group, for example, the acetyl group, to either or both of the $N^1$- and $N^4$-positions, have been tried in an effort to modify their properties. However, no modification atempted to date has effected a substantial reduction in toxicity while at the same time having little or no adverse effect on the antibacterial activity of the parent sulfanilamide.

It has now been discovered by this invention that the toxicity of $N^1$-(isoxazolyl)sulfanilamides is substantially reduced without significant impairment of antibacterial activity by the presence of at least one of an $N^1$- or an $N^4$-alkoxyacetyl group, resulting in compounds which are represented by the formula:

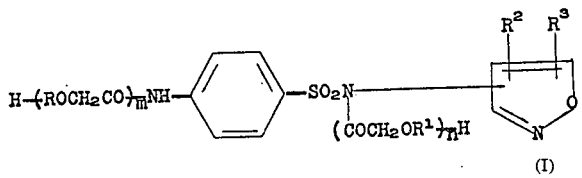

(I)

wherein each of R and $R^1$, when taken separately, is lower alkylene; each of $R^2$ and $R^3$, when taken separately, is hydrogen, lower alkyl, lower alkoxy, phenyl, or halo; and each of m and n, when taken separately, is an integer having a value of from 0 to 1, with the proviso that at least one of n and m is 1.

Preferred compounds are those wherein the isoxazolyl substituent is either 3-isoxazolyl of the formula

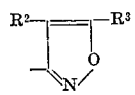

or 5-isoxazolyl of the formula

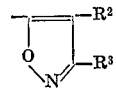

substituted with at least one lower alkyl group, especially methyl. The 5-methyl-3-isoxazolyl and 3,4-dimethyl-5-isoxazolyl groups are particularly preferred. Especially preferred products are those wherein R and $R^1$ each are alkylene of from 1 to about 4 carbons, with those wherein m is 0 and n is 1 being most preferred.

By the terms "lower alkyl" and "lower alkoxy" are meant branched and straight chain alkyl and alkoxy groups of from 1 to about 6 carbons, inclusive, such as methyl, ethyl, n-propyl, isopropyl, tert.-butyl, methoxy, ethoxy, tert.-butoxy, and the like. Methyl and methoxy groups are preferred.

By the term "lower alkylene" is meant a branched or straight chain alkylene group of from 1 to about 10 carbons, inclusive, such as methylene, ethylene, isopropylene, trimethylene, tetramethylene, decamethylene, and the like. Straight chain alkylene groups are preferred.

By the term "halogen" is meant a halogen having an atomic number of from 17 to 53, inclusive, i.e., chlorine, bromine, and iodine.

Illustrative examples of the sulfanilamides of this invention include:

$N^1$-(methoxyacetyl)-$N^1$-(5-methyl-3-isoxazolyl) sulfanilamide,
$N^4$-(methoxyacetyl)-$N^1$-(5-methyl-3-isoxazolyl) sulfanilamide,
$N^1,N^4$-bis(methoxyacetyl)-$N^1$-(5-methyl-3-isoxazolyl) sulfanilamide,
$N^1$-(ethoxyacetyl)-$N^1$-(5-methyl-3-isoxazolyl) sulfanilamide,
$N^1$-(n-propoxyacetyl)-$N^1$-(5-methyl-3-isoxazolyl) sulfanilamide,
$N^1$-(isopropoxyacetyl)-$N^1$-(5-methyl-3-isoxazolyl) sulfanilamide,
$N^1$-(tert.-butoxyacetyl)-$N^1$-(5-methyl-3-isoxazolyl) sulfanilamide,
$N^1$-(ethoxyacetyl)-$N^4$-(methoxyacetyl)-$N^1$-(5-methyl-3-isoxazolyl)sulfanilamide,
$N^1$-(methoxyacetyl)-$N^1$-(3,4-dimethyl-5-isoxazolyl) sulfanilamide,
$N^1$-(methoxyacetyl)-$N^1$-(4,5-dimethyl-3-isoxazolyl) sulfanilamide,
$N^1$-(methoxyacetyl)-$N^1$-(4-methyl-5-methyl-3-isoxazolyl)-sulfanilamide,
$N^1$-(methoxyacetyl)-$N^1$-(5-phenyl-3-isoxazolyl) sulfanilamide,
$N^1$-(methoxyacetyl)-$N^1$-(4-chloro-5-methyl-3-isoxazolyl)-sulfanilamide, and the like.

The products of this invention are readily obtained from the unacylated $N^1$-isoxazolylsulfanilamides of the formula:

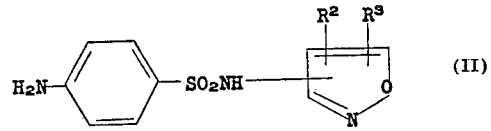

(II)

wherein $R^2$ and $R^3$ are as defined above.

For example, the (lower alkoxyacetyl)-derivatives can be obtained by reaction of a lower alkoxyacetic acid with the sulfanilamide (II). This reaction is generally effected under ambient conditions in the presence of N,$N^1$-dicyclohexylcarbodiimide and an organic base such as pyridine.

A highly preferred procedure for producing the compounds of this invention employs a lower alkoxyacetic anhydride as the acylating agent. By this technique, the N¹-(lower alkoxyacetyl)-derivatives are obtained by the reaction of an alkali metal, preferably sodium, salt of the sulfanilamide (II) with a lower alkoxyacetic acid anhydride. The conditions employed for this reaction are not narrowly critical, although substantially anhydrous conditions are preferred. Although elevated temperatures can be employed, the reaction is normally effected at reduced temperatures, i.e., below room temperature (about 20–25° C.), with temperatures in the range of from 0° C. to about 15° C. being preferred. In addition, this reaction is preferably effected in the presence of an organic base as a promoter. Suitable bases include tertiary amines, such as pyridine, picoline, lutidine, quinoline, and trialkylamines (e.g., triethylamine) and alkali-metal or alkaline-earth metal acylates, especially acetates, such as sodium acetate. The reactants and organic base are generally employed in equimolar proportions, although this is not essential. The reaction can be effected in the presence of an inert organic solvent, including ketones, such as acetone or methyl ethyl ketone; ethers such as dioxane or tetrahydrofuran; aromatic hydrocarbons such as benzene, toluene or xylene; chlorinated hydrocarbons such as chloroform; and the like. The use of such solvents is not necessary, however, when the organic base is liquid under the reaction conditions. In this case, one can employ excess base as the reaction medium.

The N⁴-(alkoxyacetyl)sulfanilamides of this invention can be obtained as by-products of the above-described process. In addition, they can be formed by the isomerization of the N¹-(alkoxyacetyl)sulfanilamide. This isomerization is readily effected at elevated temperature, for example, from about 50° C. to about 100° C. or higher, in the presence of an organic base, e.g., pyridine, and water. It is for this reason that, when N¹-(alkoxyacetyl) sulfanilamides are to be produced in the manner described above that reduced temperatures and substantially anhydrous conditions are preferred. In this connection, it should be noted that the N¹- and N⁴-monoalkoxyacylated isomers may be easily distinguished by their solubility in alkali, for the N¹-derivative is insoluble whereas the N⁴-derivative is soluble in alkali.

A preferred technique for directly producing the N⁴-(alkoxyacetyl)sulfanilamides of this invention comprises reacting an alkoxyacetic acid anhydride with the free sulfanilamide. The conditions of this reaction are not narrowly critical, although temperatures in the range of from about 10° C. to about 40° C. are normally employed, with ambient temperatures being preferred. Although not essential, the reactants are normally employed in equimolar amounts. This reaction is preferably effected under substantially anhydrous conditions, and in the presence of an inert organic solvent, such as those mentioned above.

The N¹,N⁴-bis(alkoxyacetyl)sulfanilamides of this invention may be obtained by employing conditions similar to those described above with reference to the monoalkoxyacetyl products, except that excess alkoxyacetic acid anhydride is employed. It is preferred, however, to first produce the N¹-(alkoxyacetyl)sulfanilamide in the manner described above, and then introduce the N⁴-substituent under the conditions described above for producing the N⁴-monoalkoxyacetyl compound.

The lower alkoxyacetic acid anhydrides employed in the above-described processes are readily produced by the following reaction sequence:

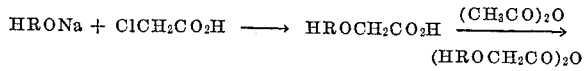

in which an alkali metal alkoxide, preferably sodium alkoxide, is reacted with chloroacetic acid to produce the corresponding alkoxyacetic acid, which, in turn, is reacted with acetic anhydride to produce the desired alkoxyacetic anhydride.

These steps are effected by generally known techniques wherein:

(1) Small pieces of sodium metal are added to the selected alcohol (HROH) and the resulting mixture is refluxed until solution is complete.

(2) A solution of chloroacetic acid in the selected alcohol is added dropwise to a stirred sodium alkoxide solution at an elevated temperature sufficient to maintain the sodium alkoxide in solution, followed by refluxing the resulting mixture for from about 1 to about 3 hours.

(3) After removal of the alcohol and addition of water, the reaction mixture is acidified with a suitable mineral acid, for example, sulfuric acid, preferably after the addition of sufficient water to prevent crystallization of salts. The resulting alkoxyacetic acid is recovered by conventional techniques, such as extraction with ether, drying of the extracts over sodium sulfate, followed by concentration under reduced pressure and then distillation.

(4) A mixture, preferably equimolar, of the alkoxyacetic acid and acetic anhydride is refluxed briefly, for example, 10 to about 40 minutes, and then slowly distilled to remove acetic acid. If desired, the residue, comprising the alkoxyacetic anhydride, may be redistilled.

The following examples are illustrative.

Example 1.—N¹-methoxyacetyl-N¹-(3,4-dimethyl-5-isoxazolyl)sulfanilamide

A 24.3-gram portion of methoxyacetic anhydride was added to a mixture of 43.4 grams of the sodium salt of N¹-(3,4-dimethyl-5-isoxazolyl)sulfanilamide and 150 milliliters of pyridine over a 10-minute period while stirring the reaction mixture and cooling it in an ice bath to maintain the reaction temperature at 3–5° C. After stirring the reaction mixture for an additional 2 hours, it was poured into 1.5 liters of cold water and the resulting mixture was stirred for 20 minutes at 5–10° C. After filtration of the reaction mixture, the solid product was washed with two 200-milliliter portions of cold water and then dissolved in 84 milliliters of hot acetonitrile. After filtration of the solution and crystallization in an ice bath, there was obtained N¹-methoxyacetyl-N¹-(3,4-dimethyl-5-isoxazolyl)sulfanilamide, melting point 161–165° C. On recrystallization from acetonitrile, the product melted at 168–169° C.

*Analysis* (after recrystallization once from -acetone water and twice from acetonitrile).—Calculated for $C_{14}H_{17}N_3O_5S$: C, 49.55; H, 5.05; N, 12.38. Found: C, 49.63; H, 4.91; N, 12.44.

Example 2.—N¹-methoxyacetyl-N¹-(5-methyl-3-isoxazolyl)sulfanilamide

A 48.6-gram portion of methoxyacetic anhydride was added over a 45-minute period to a stirred suspension of 82.5 grams of the sodium salt of N¹-(5-methyl-3-isoxazolyl)sulfanilamide in 230 milliliters of pyridine, while cooling the reaction mixture with ice to maintain the reaction temperature at 3–4° C. After stirring at this temperature for an additional 2.3 hours, the resulting gelatinous mixture was poured into 2 liters of cold water, employing an additional 600 milliliters of cold water wash. A gummy precipitate formed, which solidified after stirring for 20 minutes. While maintaining the reaction temperature below 10° C., 50 milliliters of a 10 percent sodium hydroxide solution was added to adjust the pH of the solution to about 10. The product, after filtration from the reaction mixture, washing with four 300-milliliter portions of water, and recrystallization from acetonitrile, melted at 166–169° C. (dec.). After further purification, the product melts at 171–172° C.

*Analysis.*—Calculated for $C_{13}H_{15}N_3O_5S$: C, 47.99; H, 4.65; N, 12.90; $CH_3O$—, 9.54. Found: C, 48.24; H, 4.56; N, 12.70; $CH_3O$—, 9.72.

Example 3.—N¹-ethoxyacetyl-N¹-(5-methyl-3-isoxazolyl)sulfanilamide

A 57.0-gram portion of ethoxyacetic anhydride was added to a stirred mixture of 82.5 grams of the sodium salt of N¹-(5-methyl-3-isoxazolyl)sulfanilamide in 300 milliliters of pyridine, while cooling with ice to maintain the reaction temperature at 4–5° C. After stirring for an additional 1.5 hours, the reaction solution was poured into 3 liters of cold water and stirred for 30 minutes. The precipitate was filtered from the reaction mixture and washed with cold water. The crude product was dissolved in 280 milliliters of warm acetone and, after filtration of the solution, there was added 40 milliliters of water to initiate crystallization, which was completed by cooling in ice. The resulting product melted at 174–176° C.

*Analysis* (after recrystallization from acetone-water).— Calculated for $C_{14}H_{17}N_3O_5S$: C, 49.55; H, 5.05; N, 12.38. Found: C, 49.84; H, 5.07; N, 12.33.

Example 4.—$N^1$-propoxyacetyl-$N^1$-(5-methyl-3-isoxazolyl)sulfanilamide

A 43.6-gram portion of propoxyacetic anhydride was added dropwise over a 15-minute period to a stirred mixture of 55.0 grams of the sodium salt of $N^1$-(5-methyl-3-isoxazolyl)sulfanilamide and 300 milliliters of pyridine, while stirring the reaction mixture and cooling with ice to maintain a temperature of 2–4° C. After stirring the mixture for an additional 2 hours, it was poured into a mixture of 1800 milliliters of cold water and 200 milliliters of acetone. The resulting precipitate was filtered from the reaction mixture and washed with water. After two recrystallizations from acetonitrile, there was obtained $N^1$-propoxyacetyl-$N^1$-(5-methyl-3-isoxazolyl)sulfanilamide melting at 141–143° C.

*Analysis.*—Calculated for $C_{15}H_{19}N_3O_5S$: C, 50.98; H, 5.42; N, 11.89. Found: C, 51.14; H, 5.53; N, 11.75.

Example 5.—$N^1$-butoxyacetyl-$N^1$-(5-methyl-3-isoxazolyl)sulfanilamide

Employing procedures similar to those described above, 49.2 grams of butoxyacetic anhydride was allowed to react with 55.0 grams of the sodium salt of $N^1$-(5-methyl-3-isoxazolyl)sulfanilamide to produce $N^1$-butoxyacetyl-$N^1$-(5-methyl-3-isoxazolyl)sulfanilamide, melting point 99–101° C. (dec.).

*Analysis.*—Calculated for $C_{16}H_{21}N_3O_5S$: C, 52.30; H, 5.76; N, 11.44. Found: C, 52.66; H, 5.85; N, 11.32.

Example 6.—$N^1$-octoxyacetyl-$N^1$-(5-methyl-3-isoxazolyl)sulfanilamide

Employing procedures similar to those described above, 35.8 grams of octoxyacetic anhydride was allowed to react with 27.5 grams of the sodium salt of $N^1$-(5-methyl-3-isoxazolyl)sulfanilamide to produce $N^1$-octoxyacetyl-$N^1$-(5-methyl-3-isoxazolyl)sulfanilamide, melting point 95–97° C.

Example 7.—$N^4$-methoxyacetyl-$N^1$-(5-methyl-3-isoxazolyl)sulfanilamide

To a stirred solution of 15.2 grams of $N^1$-(5-methyl-3-isoxazolyl)sulfanilamide in 60 milliliters of acetone maintained below 30° C., there was added over a 5-minute period 9.73 grams of methoxyacetic anhydride. When the initial reaction subsided, the stirrer was stopped and the reaction mixture was allowed to stand for 4 hours, during which period crystallization occurred. The resulting mixture was stirred and cooled in ice for 20 minutes and then filtered. The filter cake was washed with ice cold acetone and then recrystallized from methanol to yield $N^4$-methoxyacetyl-$N^1$-(5-methyl-3-isoxazolyl)sulfanilamide, melting at 171–173° C.

*Analysis* (after recrystallization from acetone-water).— Calculated for $C_{13}H_{15}N_3O_5S$: C, 47.99; H, 4.65; N, 12.92. Found: C, 48.28; H, 4.64; N, 12.95.

Example 8.—$N^4$-ethoxyacetyl-$N^1$-(5-methyl-3-isoxazolyl)sulfanilamide

To a stirred solution of 15.2 grams of $N^1$-(5-methyl-3-isoxazolyl)sulfanilamide in 60 milliliters of acetone maintained below 30° C., there was added over a 5-minute period 11.4 grams of ethoxyacetic anhydride. After about 10 minutes, a precipitate began to separate. After stirring for 3 hours the mixture was chilled in ice for 30 minutes, filtered, and the filter cake was washed with ice cold acetone. The crude product was then dissolved in 300 milliliters of warm acetone and, after the addition of an equal volume of water, crystalliaztion occurred. The thus-obtained $N^4$-ethoxyacetyl-$N^1$-(5-methyl-3-isoxazolyl)sulfanilamide melted at 178–180° C.

*Analysis* (after recrystallization from acetone-water).— Calculated for $C_{14}H_{17}N_3O_5S$: C, 49.55; H, 5.05; N, 12.38. Found: C, 49.62; H, 4.99; N, 12.35.

Example 9.—$N^4$-propoxyacetyl-$N^1$-(5-methyl-3-isoxazolyl)sulfanilamide

Employing procedures similar to those described in Example 7, but 9.70 grams of propoxyacetic anhydride was allowed to react with 11.3 grams of $N^1$-(5-methyl-3-isoxazolyl)sulfanilamide to produce $N^4$-propoxyacetyl-$N^1$-(5-methyl-3-isoxazolyl)sulfanilamide, melting point 188–189° C.

*Analysis.*—Calculated for $C_{15}H_{19}N_3O_5S$: C, 50.98; H, 5.42; N, 11.89. Found: C, 51.26; H, 5.12; N, 11.96.

Example 10.—$N^4$-butoxyacetyl-$N^1$-(5-methyl-3-isoxazolyl)sulfanilamide

Employing procedures similar to those described in Example 7, 14.4 grams of butoxyacetic anhydride were allowed to react with 14.8 grams of $N^1$-(5-methyl-3-isoxazolyl)sulfanilamide to produce $N^4$-butoxyacetyl-$N^1$-(5-methyl-3-isoxazolyl)sulfanilamide, melting point 144–145° C.

*Analysis.*—Calculated for $C_{16}H_{21}N_3O_5S$: C, 52.30; H, 5.76; N, 11.44. Found: C, 52.12; H, 5.70; N, 11.39.

Example 11.—$N^1,N^4$-bis(methoxyacetyl)-$N^4$-(5-methyl-3-isoxazolyl)sulfanilamide To a solution of 10.0 grams of $N^1$-methoxyacetyl-$N^1$-(5-methyl-3-isoxazolyl)sulfanilamide, produced in a manner similar to that described in Example 2, in 60 milliliters of acetone, there was added 10.0 grams of methoxyacetic anhydride. After allowing the reaction mixture to stand for four hours, there was added 120 milliliters of petroleum ether (boiling point 30–60° C.), whereupon $N^1,N^4$-bis(methoxyacetyl)-$N^1$-(5-methyl-3-isoxazolyl)sulfanilamide crystallized. After recrystallization from methanol, the product melted at 124–126° C.

*Analysis.*—Calculated for $C_{16}H_{19}N_3O_7S$: C, 48.36; H, 4.82; N, 10.57. Found: C, 48.20; H, 4.90; N, 10.40.

Example 12.—$N^1,N^4$-bis(ethoxyacetyl)-$N^1$-(5-methyl-3-isoxazolyl)sulfanilamide Employing procedures similar to those described in Example 11, 8.5 grams of $N^1$-ethoxyacetyl-$N^1$-(5-methyl-3-isoxazolyl)sulfanilamide, produced in a manner similar to that described in Example 3, was allowed to react with 9.5 grams of ethoxyacetic anhydride to produce $N^1,N^4$-bis(ethoxyacetyl)-$N^1$-(5-methyl-3-isoxazolyl)sulfanilamide, melting point 105–107° C.

*Analysis.*—Calculated for $C_{18}H_{23}N_3O_7S$: C, 50.81; H, 5.45; N, 9.88. Found: C, 51.09; H, 5.10; N, 9.83.

Example 13.—$N^1$-ethoxyacetyl-$N^4$-methoxyacetyl-$N^1$-(5-methyl-3-isoxazolyl)sulfanilamide Employing procedures similar to those described in Example 11, $N^1$-ethoxyacetyl-$N^1$-(5-methyl-3-isoxazolyl)-sulfanilamide is allowed to react with methoxyacetic anhydride to produce $N^1$-ethoxyacetyl-$N^4$-methoxyacetyl-$N^1$-(5-methyl-3-isoxazolyl)sulfanilamide.

Example 14

The in vivo antibacterial activities of the sulfanilamides of this invention were determined in mice against the following infections:

(1) *Escherichia coli* 257
(2) *Klebsiella pneumoniae* A
(3) *Proteus vulgaris* 190
(4) *Pseudomonas aeruginosa* B (5) *Salmonella schottmuelleri*
(6) *Salmonella typhosa* P58a
(7) *Staphylococcus aureus* Smith
(8) *Streptococcus hemolyticus* No. 4

For each infecting agent, mice were infected by an intraperitoneal injection containing 100 to 1000 times the minimum lethal dose of the infecting agent per mouse. Treatment groups of ten infected mice each were then treated immediately with the test drug, with different treatment groups having the same infection being treated with the same drug at different dosage levels. The treatment schedule varied with the infection as follows:

Infection No.:     Treatment
6 _____ No subsequent treatment (i.e., only one treatment)
1, 3, 4, 5 and 7 ____ Daily treatments at the original dosage on the first, second and third days following infection (i.e., four treatments)
2 and 8 _____ A second treatment 4 to 6 hours after infection, two treatments on the first day after infection and one treatment on each of the second and third days after infection (i.e., six treatments)

All infected animals, including an untreated control group, were observed for a total of 14 days, and the number of survivors was noted. Cultures were made from the hearts of all animals to ascertain the presence of the infecting organism. The results are reported as $CD_{50}$ in mg./kg. as calculated by the method of Reed and Muench, Am. Jour. Hygiene, 27, 493 (1938).

Acute toxicity was determined by administering a different dosage of the drug under evaluation to each of seevral groups of 6 mice per group. A count of the animals that died or survived is made after 72 hours and the results are reported as $LD_{50}$ in mg./kg. as calculated by the method of Reed and Muench, Am. Jour. Hygiene, 27, 493 (1938).

The result of these tests on certain of the $N^1$-(5-methyl-3-isoxazolyl)sulfanilamide derivatives of this invention are summarized in Table I. Also included for purposes of comparison are the results for the unsubstituted sulfanilamide and the $N^1$-acetyl-substituted sulfanilamide.

50 parts of $N^1$-methoxyavetyl-$N^1$-(5-methyl-3-isoxazolyl)-sulfanilamide is mixed with 125 parts of lactose and 30 parts of cornstarch in a suitable mixer. The mixture is further blended by passing through a Fitzpatrick comminuting machine with a No. 1A screen with knives forward. The blended powder is returned to the mixer and the 5 parts of talc added and blended thoroughly. Thereafter, the mixture is filled into No. 4 hard shell gelatin capsules on a Parke-Davis capsulating machine. Each capsule contains 210 mg. of the formulation.

(B)     Tablets formulation

Per tablet, parts
$N^1$-methoxyacetyl-$N^1$ - (5-methyl-3-isoxazolyl)sulfanilamide (2 percent excess) _____ 255
Dicalcium phosphate dihydrate, unmilled _____ 230
Cornstarch _____ 70
FD and C Yellow No. 5—Aluminum Lake 25 percent _____ 2
Hydrogenated cottonseed oil _____ 25
Calcium stearate _____ 3

Total weight _____ 585

All the ingredients are mixed thoroughly and passed through a Fitzpatrick comminutting machine (Model D) using a No. 1A screen, medium speed. Thereafter, the mixture is remixed and slugged. The slugs are screened on an oscillator through a No. 14 mesh screen and then compressed into tablets containing 585 mg. of formulation per tablet. The hydrogenated cottonseed oil utilized is Durkee 117 (Durkee Famous Foods—Division of the Glidden Co.) comprising mixed di- and tri-glycerides.

(C)     Parenteral formulation

According to the procedures exemplified by (1) and (2) hereinbelow, parenteral suspensions and/or solutions are prepared for each of the following sulfanilamides:

$N^1$-methoxyacetyl-$N^1$-(3,4-dimethyl-5-isoxazolyl)sulfanilamide $N^1$-ethoxyacetyl-$N^1$-(5-methyl-3-isoxazolyl)sulfanilamide $N^1$-butoxyacetyl-$N^1$-(5-methyl-3-isoxazolyl)sulfanilamide $N^1$-propoxyacetyl-$N^1$-(5-methyl-3-isoxazolyl)sulfanilamide

| Substituent | Antibacterial activity, $CD_{50}$, p.o. | | | | | | | | $LD_{50}$, p.o. |
|---|---|---|---|---|---|---|---|---|---|
| | 1 | 2 | 3 | 4 | 5 | 6 | 7 | 8 | |
| $N^1$-methoxy-acetyl | 93 | 57 | 29 | 144 | 83 | 42 | 351 | 87 | 8,351 |
| $N^1$-ethoxy-acetyl | 102 | 106 | 77 | 187 | 152 | 28 | 268 | 111 | >10,000 |
| $N^1$-propoxy-acetyl | 67 | 29 | 35 | 124 | 80 | 20 | 128 | 69 | >10,000 |
| $N^1$-butoxy-acetyl | 139 | | 76 | 212 | 128 | 16 | ~300 | 69 | 7,070 |
| $N^4$-methoxy-acetyl | 327 | >500 | 139 | 277 | 154 | 34 | 378 | ~500 | >10,000 |
| $N^4$-ethoxy-acetyl | 274 | 61 | 92 | 134 | 77 | 37 | 328 | 182 | >10,000 |
| None | 110 | 59 | 42 | 120 | 102 | 58 | 178 | 103 | 3,393 |
| $N^1$-acetyl | 90 | 46 | 27 | 53 | 174 | 25 | 299 | 104 | 4,176 |

As is readily apparent, the products of this invention, while having generally similar antibacterial activities, have substantially reduced toxicities in comparison with the unsubstituted and the $N^1$-acetylsulfanilamides. Of especial interest are the $N^1$-ethoxy- and propoxyacetyl derivatives and the $N^4$-methoxy- and ethoxyacetyl derivatives, which are substantially atoxic.

Example 15

The products of this invention may be formulated as follows:

(A)     Capsules formulation

Per capsule, mg.
$N^1$-methoxyacetyl-$N^1$-(5-methyl - 3 - isoxazolyl)-sulfanilamide _____ 50
Lactose, U.S.P. _____ 125
Cornstarch, U.S.P. _____ 30
Talc. U.S.P. _____ 5

Total weight _____ 210

$N^1$,$N^4$-bis-methoxyacetyl-$N^1$-(5-methyl-3-isoxazolyl)-sulfanilamide $N^1$,$N^4$-bis-ethoxyacetyl-$N^1$-(5-methyl-3-isoxazolyl)-sulfanilamide $N^1$-octoxyacetyl-$N^1$-(5-methyl-3-isoxazolyl)sulfanilamide (1) Parenteral suspension—for I.M. use only Per ml.
$N^1$-methoxyacetyl-$N^1$-(5 - methyl-3-isoxazolyl)sulfanilamide _____mg__ 100.0
Polysorbate 80, U.S.P. _____do____ 1.0
Sodium thimerasol _____do____ 0.1
Acetic acid—sodium acetate buffer, used to approximately pH _____ 5
Water for injection, q.s. _____ml__ 1

10 grams of polysorbate 80, U.S.P. and 1 gram of sodium thimerasol are dissolved in approximately 8 liters of water for injection. 1000 grams of $N^1$-methoxyacetyl-$N^1$-(5-methyl-3-isoxazolyl)sulfanilamide, previously precipitated and dried under aseptic conditions and micronized under aseptic conditions to yield a fine powder with an average particle size of less than 50 microns, are slurried and suspended in the above solution. As the resulting suspension is brought up to 10 liters with water for injection, the pH is checked and adjusted to approximately pH 5 with a w./v. solution containing ⅛% acetic acid and ⅛% sodium acetate. Thereafter, the suspension, under constant agitation to prevent settling, is filled into suitable size ampules, gassed with nitrogen and sealed. The ampules are sterilized at 70° C. for 2 hours. This parenteral suspension is intended for intramuscular use only.

(2) Parenteral solution

| | Per ml. |
|---|---|
| $N^1$ - methoxyacetyl - $N^1$ - (5-methyl - 3 - isoxazolyl) sulfanilamide mg | 1.0 |
| Propylene glycol ml | 0.5 |
| Benzyl alcohol (benzaldehyde free) ml | 0.02 |
| Ethanol 95 percent, U.S.P. ml | 0.10 |
| Water for injection, q.s. ml | 1.0 |

10 grams of $N^1$ - methoxyacetyl - $N^1$ - (5 - methyl - 3 - isoxazolyl)-sulfanilamide are dissolved in 200 ml. of benzyl alcohol. To this solution are then added with stirring 5000 ml. of propylene glycol and 1000 ml. of ethanol. The solution is brought up to final volume of 10,000 ml. with water for injection and then filtered through an 02 Selas candle. Thereafter, the solution is filled aseptically into previously sterilized ampules of suitable size, gassed with nitrogen and sealed.

According to the procedure exemplified by (3) hereinbelow, parenteral solutions are prepared for each of the following sulfanilamides:

$N^4$-ethoxyacetyl-$N^1$-(5-methyl-3-isoxazolyl)sulfanilamide
$N^4$-propoxyacetyl-$N^1$-(5-methyl-3-isoxazolyl)-sulfanilamide
$N^4$-butoxyacetyl-$N^1$-(5-methyl-3-isoxazolyl)sulfanilamide (3) Parenteral solution

| | Per cc. |
|---|---|
| $N^4$ - methoxyacetyl - $N^1$ - (5-methyl - 3 - isoxazolyl) sulfanilamide mg | 1.0 |
| Disodium edetate, U.S.P. mg | 0.1 |
| Sodium hydroxide, ad pH mg | 10 |
| Water for injection, q.s. ad ml | 1.0 |

10 grams of $N^4$ - methoxyacetyl-$N^1$-(5-methyl-3-isoxazolyl)sulfanilamide and 1 gram of disodium edetate are added to liters of the water for injection and the pH brought to pH 10 with sodium hydroxide. The solution is then brought to final volume of 10 liters with water for injection and filtered through an 02 Selas candle. The solution is filled under aseptic conditions into the desired size sterile ampules and sealed under an atmosphere of nitrogen. All ampules are inspected, and those containing excessive amounts of fibers are rejected.

(D) Premix for animal use

| $N^1$ - methoxyacetyl - $N^1$ - (5-methyl-3-isoxazolyl) sulfanilamide | 125 |
|---|---|
| Corn germ meal | 831 |
| Fractionated coconut oil | 44 |
| Total parts | 1000 |

831 parts o fcorn germ meal are placed in a suitable mixer and 44 parts of fractionated coconut oil (Drew oil 1400—Drew Chemical Corporation) are slowly added and thoroughly mixed. 125 parts of $N^1$-methoxyacetyl-$N^1$-(5-methyl-3-isoxazolyl)sulfanilamide, with mixing, are slowly added and the mixing continued until the mixture is homogeneous. This premix is then added to a commercial poultry feed at the ratio of 2 lbs./ton to yield a ratio of 0.0125 percent of drug, and thoroughly mixed. This medicated feed may be used in the mash form or it may be pelleted on a Sprout-Waldron pellet mill. Amounts of the above premix may be added to the commercial feed to yield medicated levels ranging from 0.0025 percent to 0.05 percent. The commercial feeds to which this premix is added may be free of other medicaments or may contain other medicaments, if the final mixture is compatible.

(E) Veterinary drinking water

According to the procedure exemplified by (1) hereinbelow, veterinary drinking water is prepared for each of the following sulfanilamides:

$N^4$-propoxyacetyl-$N^1$-(5-methyl-3-isoxazolyl)-sulfanilamide
$N^4$-ethoxyacetyl-$N^1$-(5-methyl-3-isoxazolyl)sulfanilamide
$N^4$-butoxyacetyl-$N^1$-(5-methyl-3-isoxazolyl)sulfanilamide (1) Veterinary drinking water solution, 5 percent, w./v.

| | Per ml. |
|---|---|
| $N^4$-methoxyacetyl-$N^1$-(5-methyl-3-isoxazolyl)sulfanilamide mg | 50 |
| Sodium edetate mg | 0.1 |
| Sodium bisulfite mg | 1.0 |
| Sodium hydroxide, q.s. ad pH | 10 |
| Distilled water, q.s. ad | 1 |

Approximately 6.5 liters of distilled water, U.S.P., are collected at room temperature in a stainless steel or glass-lined vessel equipped with a wide-sweep or anchor-type, moderate-speed agitator.

500 grams of $N^4$-methoxyacetyl-$N^1$-(5-methyl-3-isoxazolyl)-sulfanilamide are added with stirring to the water to form a slurry.

A solution of 10 percent sodium hydroxide w./w. in distilled water is prepared and added slowly to the $N^4$-methoxyacetyl-$N^1$-(5-methyl-3-isoxazolyl)sulfanilamide slurry. As the $N^4$ - methoxyacetal-$N^1$-(5-methyl-3-isoxazolyl)sulfanilamide dissolved, the pH is checked regularly to attain a pH of 10.2±0.2. [A small amount of $N^4$-methoxyacetyl-$N^1$-(5-methyl-3-isoxazolyl)sulfanilamide or sodium hydroxide solution can be used to adjust the pH if required.] A solution of 1 gram of disodium edetate and 10 grams of sodium bisulfite in 200 ml. of distilled water is prepared. Its pH is adjusted to 10.2±0.2 by 10 percent sodium hydroxide. This solution is added to the main solution.

The pH of the combined solutions is checked and adjusted to 10.2±0.2. [Use sodium hydroxide solution if the pH is below 10.0 or a small amount of $N^4$-methoxyacetyl-$N^1$-(5-methyl-3- isoxazolyl)sulfanilamide if the pH is above 10.4.]

Sufficient distilled water is added to yield a final volume of 10 liters.

The final solution is mixed by mechanical means to insure uniform blending and is filtered.

Prior to filling, a filter press is used with a coarse filter paper (i.e., Shriver press with a No. 615 Shriver pad). All equipment used must be glass or stainless steel. Tygon, Allonal or rubber tubing may be used. Avoid any contact with brass, copper or iron.

Avoid unnecessary exposure to air to prevent absorption of carbon dioxide by the alkaline solution, which affects pH and also tends to consume the antioxidant bisulfite, resulting in discoloration of the final solution on standing in finished containers.

We claim:

1. The lower alkoxyacetyl-substituted $N^1$-isoxazolyl sulfonamide selected from the group consisting of

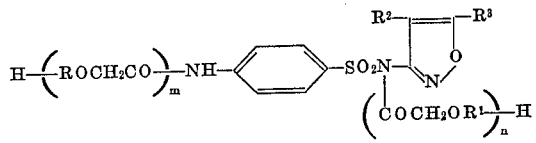

and

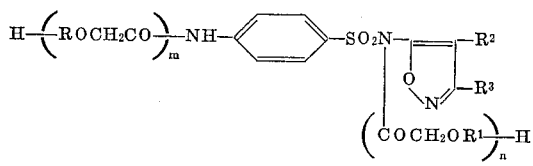

wherein each R and $R^1$, when taken separately, is lower alkylene of 1 to 10 carbon atoms; each $R^2$ and $R^3$, when taken separately is hydrogen, lower alkyl of 1 to 6 carbon atoms, lower alkoxy of 1 to 6 carbon atoms, phenyl or halo; and each of $m$ and $n$, when taken separately, is an integer having a value of from 0 to 1, with the proviso that at least one $m$ and $n$ is 1.

2. The compound as claimed in claim 1 wherein $m$ is 0 and $n$ is 1.

3. A compound as claimed in claim 1 of the formula

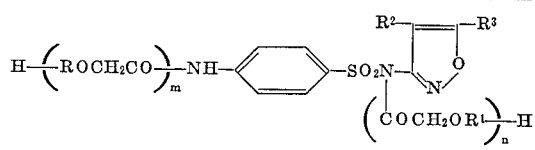

wherein $m$ is 0 and $n$ is 1.

4. A compound as claimed in claim 3 wherein $R^2$ is hydrogen and $R_3$ is methyl.

5. The compound as claimed in claim 4 wherein $R^1$ is methylene.

6. The compound as claimed in claim 4 wherein $R^1$ is ethylene.

7. The compound as claimed in claim 4 wherein $R^1$ is trimethylene.

8. The compound as claimed in claim 4 wherein $R^1$ is tetramethylene.

9. The compound as claimed in claim 4 wherein $R^1$ is octamethylene.

10. A compound as claimed in claim 1 of the formula

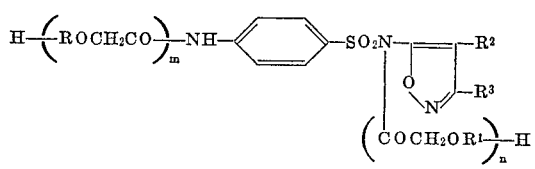

wherein $m$ is 0 and $n$ is 1.

11. A compound as claimed in claim 10 wherein $R^2$ and $R^3$ are methyl.

12. The compound as claimed in claim 11 wherein $R^1$ is methylene.

13. A compound as claimed in claim 1 wherein $m$ is 1 and $n$ is 0.

14. A compound as claimed in claim 1 of the formula

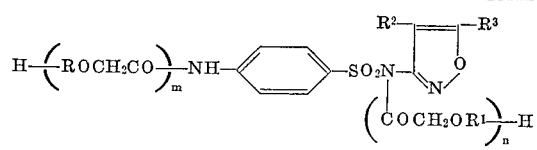

wherein $m$ is 1 and $n$ is 0.

15. A compound as claimed in claim 14 wherein $R^2$ is hydrogen and $R^3$ is methyl.

16. The compound as claimed in claim 15 wherein R is methylene.

17. The compound as claimed in claim 15 wherein R is ethylene.

18. The compound as claimed in claim 15 wherein R is trimethylene.

19. The compound as claimed in claim 15 wherein R is tetramethylene.

20. A compound as claimed in claim 1 wherein $n$ and $m$ are both 1.

21. A compound as claimed in claim 20 wherein R and $R^1$ are different.

22. A compound as claimed in claim 20 wherein R and $R^1$ are the same.

23. A compound as claimed in claim 22 of the formula

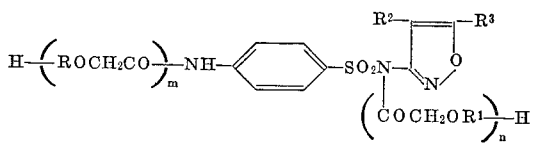

24. A compound as claimed in claim 23 wherein $R^2$ is hydrogen and $R^3$ is methyl.

25. The compound as claimed in claim 24 wherein R and $R^1$ are both methylene.

26. The compound as claimed in claim 24 wherein R and $R^1$ are both ethylene.

References Cited

UNITED STATES PATENTS 3,144,448  8/1964  Kano et al. ———— 260—239.9

JOHN D. RANDOLPH, *Primary Examiner.*

H. MOATZ, *Assistant Examiner.*

U.S. Cl. X.R.

260—535, 546; 424—229

UNITED STATES PATENT OFFICE
CERTIFICATE OF CORRECTION

Patent No. 3,422,095                                                      January 14, 1969

Harry Allen Albrecht et al.

It is certified that error appears in the above identified patent and that said Letters Patent are hereby corrected as shown below:

Column 2, line 49, "4-methyl-" should read -- 4-methoxy- --. Column 10, line 35, "$N^4$-methoxyacetal-" should read -- $N^4$-methoxyacetyl- --.

Signed and sealed this 31st day of March 1970.

(SEAL)
Attest:

Edward M. Fletcher, Jr.                                     WILLIAM E. SCHUYLER, JR.
Attesting Officer                                                   Commissioner of Patents